United States Patent [19]

Rees et al.

[11] 4,197,073

[45] Apr. 8, 1980

[54] COMBINED INJECTION-MOLDING AND BLOW-MOLDING PLANT

[75] Inventors: Herbert Rees, Willowdale; Robert Schad, Schomberg; both of Canada

[73] Assignee: Husky Injection Molding Systems Limited, Bolton, Canada

[21] Appl. No.: 904,481

[22] Filed: May 10, 1978

[51] Int. Cl.² ............................................. B29C 17/07
[52] U.S. Cl. .................................... 425/163; 264/537; 425/165; 425/533; 425/534
[58] Field of Search ............... 425/163, 165, 533, 534; 264/97, 94, 537, 538

[56] References Cited

U.S. PATENT DOCUMENTS

| | | | |
|---|---|---|---|
| 4,106,886 | 8/1978 | Sokolow | 425/534 X |
| 4,140,464 | 2/1979 | Spurr et al. | 425/533 |

Primary Examiner—Jan H. Silbaugh
Attorney, Agent, or Firm—Karl F. Ross

[57] ABSTRACT

A vertical injection-molding machine with two overlappingly operating injection molds produces two sets of eight parisons each in staggered operating cycles. Each set of parisons is transferred by a respective carrier assembly, immediately upon the opening of the respective injection mold, into the vicinity of a blow-molding unit with eight cells in which the parisons are inflated into bottles during half an injection cycle. The transfer from the closely spaced injection cavities to the blow-molding unit is performed by several carriers moving over laterally diverging tracks whereby the parisons arrive at the blow-molding unit in pockets of these carriers already separated to the extent necessary for joint introduction into the eight-cell blow mold.

7 Claims, 7 Drawing Figures

COMBINED INJECTION-MOLDING AND BLOW-MOLDING PLANT

FIELD OF THE INVENTION

Our present invention relates to a plant for producing hollow elongate workpieces, such as soft-drink bottles, from thermoplastic material by a two-stage process involving the injection molding of parisons or preforms and the subsequent expansion thereof by blow-molding technique.

BACKGROUND OF THE INVENTION

In our copending application Ser. No. 894,376, filed Apr. 7, 1978, a system of this general type has been disclosed. As explained in that application, a large number of parisons can be produced by present-day injection-molding technology in as many mold cavities in an operating cycle of about 20 seconds. Upon discharge from the mold cavities, however, these parisons are still hot and therefore not sufficiently self-supporting to permit their transportation to an associated blow-molding unit by such means as an open conveyor without precooling.

In principle, the hot and therefore geometrically unstable parisons could be transferred without intermediate cooling from the injection cavities to the blow-molding cells by a carrier designed to hold them with close fit in individual pockets to prevent any objectionable deformation thereof. Since, however, the parisons are to be inflated in the blow-molding cells to a substantially larger diameter, the width of these cells greatly exceeds that of the cavities. To facilitate a direct transfer from the injection cavities to the blow cells, the cavities and the cells would have to form similar arrays with identical center-to-center spacing, yet this would require an injection mold of large area.

Such a direct transfer, if carried out under near-adiabatic conditions, would not only save time but also have the advantage of minimizing or even eliminating the reheating normally needed in a blow mold to facilitate the expansion of the parison by fluid pressure. The transformation of a parison into a completed workpiece such as a bottle by a blow-molding step, however, generally requires much less time (usually not more than about 6 to 8 seconds) than the injection-molding operation. Thus, a blow-molding unit synchronized with an injection-molding machine would operate at less than half its capacity.

OBJECT OF THE INVENTION

The object of our present invention, therefore, is to provide a combined injection/blow-molding system capable of realizing the above-discussed direct transfer with its attendant advantages and without the aforestated drawbacks.

SUMMARY OF THE INVENTION

We realize this object, in accordance with our present invention, by the provision of programmer-controlled transfer means for delivering parisons extracted from an elongate array of injection cavities to a similar, substantially parallel array of cells of an associated blow mold, the transfer means including a set of tracks divergingly extending from the injection-molding machine to the blow-molding unit for the guidance of a plurality of carriers with heat-retaining pockets conforming to the parisons. The lateral divergence of the tracks increases the separation of the transported parisons to an extent corresponding to the difference between the relatively close center-to-center spacing of the injection cavities and the relatively wide center-to-center spacing of the blow cells in at least the major dimension of their arrays.

In order to utilize the blow-molding unit to approximately its full capacity, we prefer to provide the injection-molding machine with a pair of substantially identical injection molds each containing half the total number of cavities, the two injection molds being provided with programmer-controlled operating means for closing, filling and opening them in two recurrent injection cycles of like duration but staggered by half that duration (i.e. by 10 seconds in the case of a 20-second injection cycle). The blow-molding unit is also provided with programmer-controlled operating means for closing and opening the blow mold in a recurrent blowing cycle lasting half as long as an injection cycle. Such a staggered operation of two sections of an injection-molding machine, co-operating with a blow-molding station, has already been proposed in our above-identified copending application.

BRIEF DESCRIPTION OF THE DRAWING

The above and other features of our invention will now be described in detail with reference to the accompanying drawing in which.

SPECIFIC DESCRIPTION

Figure 1:
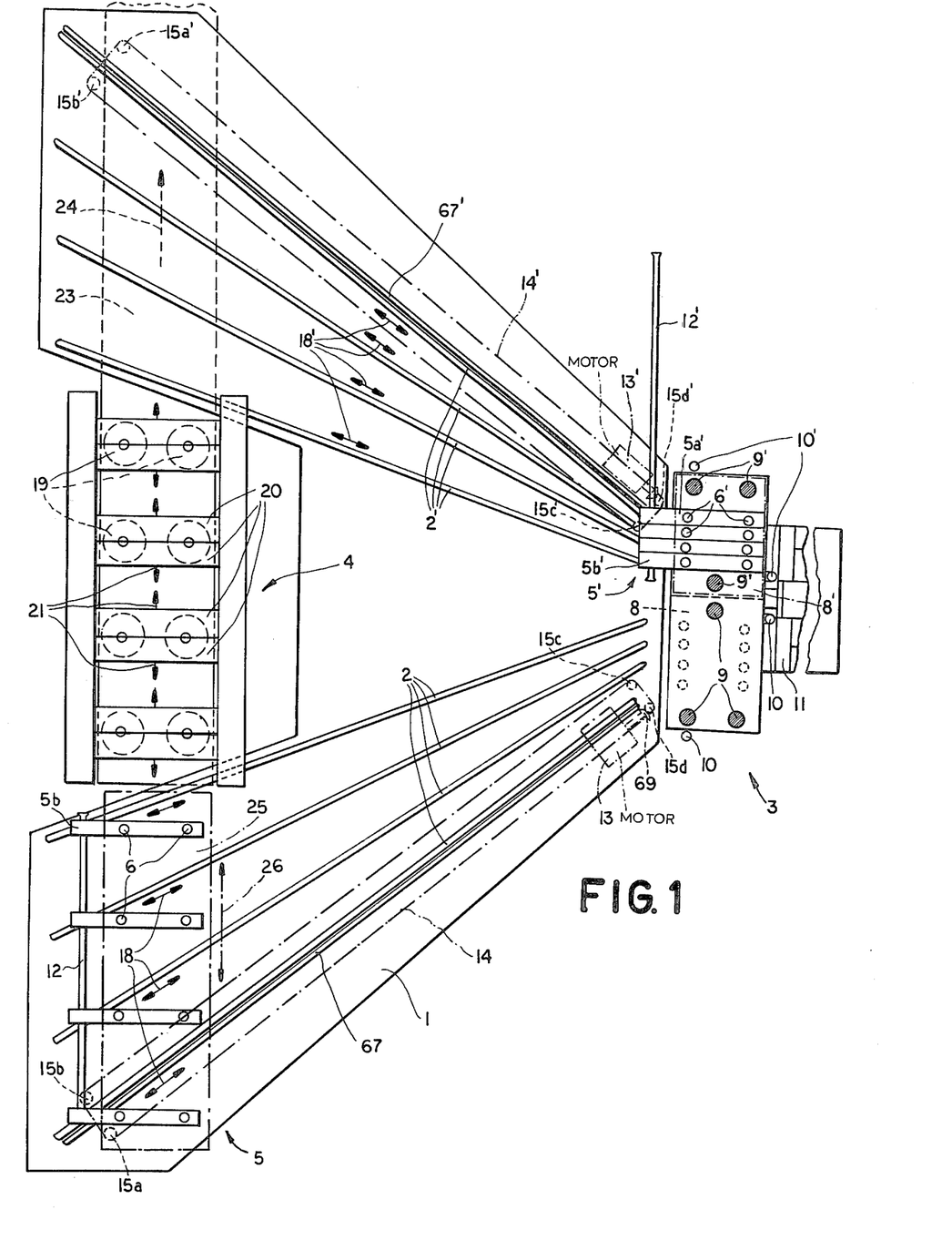
FIG. 1 is a somewhat diagrammatic top view of a lower portion of an injection-molding machine and an associated blow-molding unit in a plant embodying our invention.

In FIG. 1 we have shown a horizontal bed plate 1 supporting two groups of rails 2, 2' which diverge laterally in leading from an injection-molding machine 3 to opposite sides of a blow-molding unit 4. Each group forms guide tracks for a respective carrier assembly 5, 5' of four transfer boxes each. Two pockets 6 or 6' in each transfer box serve to receive preforms or parisons 7 (FIGS. 3 and 4) formed in injection-molding machine 3. This machine, more fully described hereinafter with reference to FIGS. 2 and 3, includes a pair of vertically reciprocable upper platens 8, 8' guided by respective tie rods 9, 9' and actuated by respective pneumatic jacks 10, 10'. Injection-molding machine 3 is fed by a conventional screw-type extruder 11.

Motors 13, 13' drive two endless chains 14, 14' each partially wound around four sprocket wheels 15a, 15b, 15c, 15d and 15a', 15b', 15c', 15d'. Each chain has a projecting lug 16, 16' coacting with a groove 17, 17' (FIGS. 2, 3, 5, 6) in a foot plate 68 of an outer transfer box 5a, 5a' for reciprocatingly sliding the two assemblies 5, 5' along guide rails 2, 2', as indicated by arrows 18, 18'. The boxes of each assembly are interconnected, with freedom of relative lateral displacement, by rods 12, 12' each rigid with an innermost transfer box 5b, 5b' of the respective assembly and slidably inserted through the other boxes thereof. Driving sprockets 15d, 15d' are coupled with motors 13, 13' via gears 69, 69' (see also FIG. 3).

Unit 4 contains eight blow-molding cavities or cells 19 arranged in two rows of four cells each. These cells are defined by four pairs of half-shells 20 which are separable, as indicated by arrows 21, to allow finished bottles 22 (FIGS. 2 and 4) to drop onto a conveyor 23 for removal from the system as indicated by an arrow 24. The blow-molding unit 4 is provided with an extractor 25 which is transversely reciprocable (arrow 26) for removing parisons 7 from transfer pockets 6 and 6' during alternate blow-molding cycles and for depositing these parisons in respective cells 19, as more fully described hereinafter with reference to FIG. 4.

Figure 2:
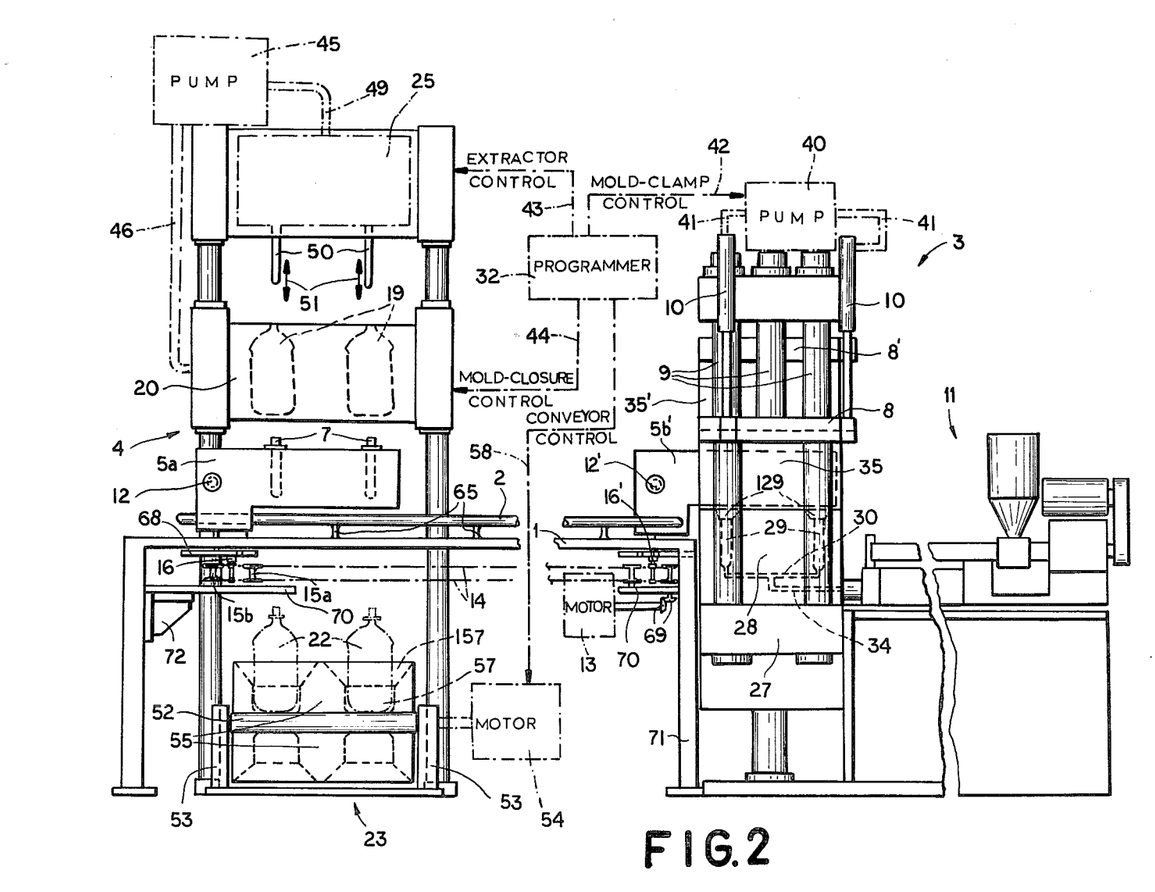
FIG. 2 is a side-elevational view of the system of FIG. 1.
Figure 3:
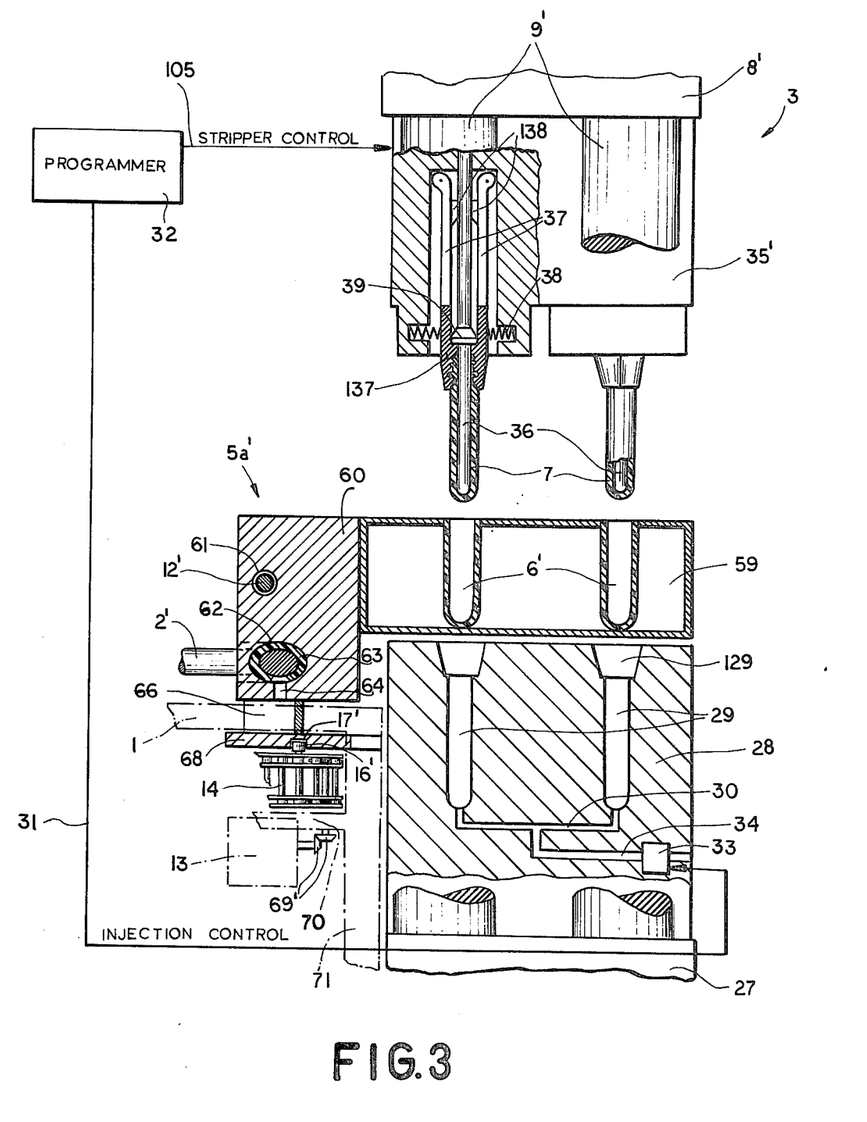
FIG. 3 is a side-elevational view, partly in section and drawn to a larger scale, of a significant part of the injection-molding machine shown in FIGS. 1 and 2.

As illustrated in FIGS. 2 and 3, injection-molding machine 3 has a stationary base platen 27 supporting a lower mold portion 28 formed with sixteen generally cylindrical cavities 29 which communicate by means of injection channels 30 with extruder 11. In response to injection-control signals on on an output line 31 of a programmer 32, a gating valve 33 in an injection manifold 34 blocks the flow of thermoplastic resin from extruder 11 to the cavities 29 underlying either the upper platen 8 or the upper platen 8'. Platens 8, 8' carry upper mold portions 35, 35' which overlie respective halves of lower mold portion 28. Each mold portion 35, 35' carries an array of four times two depending elongate cores 36 in line with respective cavities 29. Each core 36 is embraced by a tubular stripper 37 longitudinally split into two halves which are pressed by springs 38 against the associated core and whose lower extremities, provided with semiannularly recessed and helically grooved inner surfaces, constitute neck rings 137 which enter recesses 129 in lower mold portion 28 to serve as extensions of the corresponding mold cavity. The cores 36 are upwardly retractable, by conventional means not further illustrated, with reference to a respective mold portion 35 or 35' and the associated strippers 37 whereby camming formations 138 on the stripper halves coact with a shoulder 39 on the associated core 36 so that the stripper halves are spread apart and release the neck of a molded parison or preform 7.

A pump 40 connected to pneumatic jacks 10, 10', as diagrammatically indicated at 41, clamps the two upper mold portions 35 and 35' in staggered relationship to lower mold portion 28, this pump being controlled by programmer 32 via a diagrammatically illustrated circuit 42. Programmer 32 also controls the operation of extractor 25 and the separation of blow-mold half-shells 20, as diagrammatically indicated at 43 and 44 in FIG. 2. Another pump 45, likewise controlled by the programmer, pressurizes via a first conduit 46 a pair of pneumatic cylinders 47, 48 (FIG. 4) for opening and closing the half-shells 20 (FIG. 1) and supplies via a second conduit 49 pressurized air to eight blow-mold cores 50 depending from extractor 25, these cores being vertically reciprocable as indicated by double-headed arrows 51.

Figure 4:
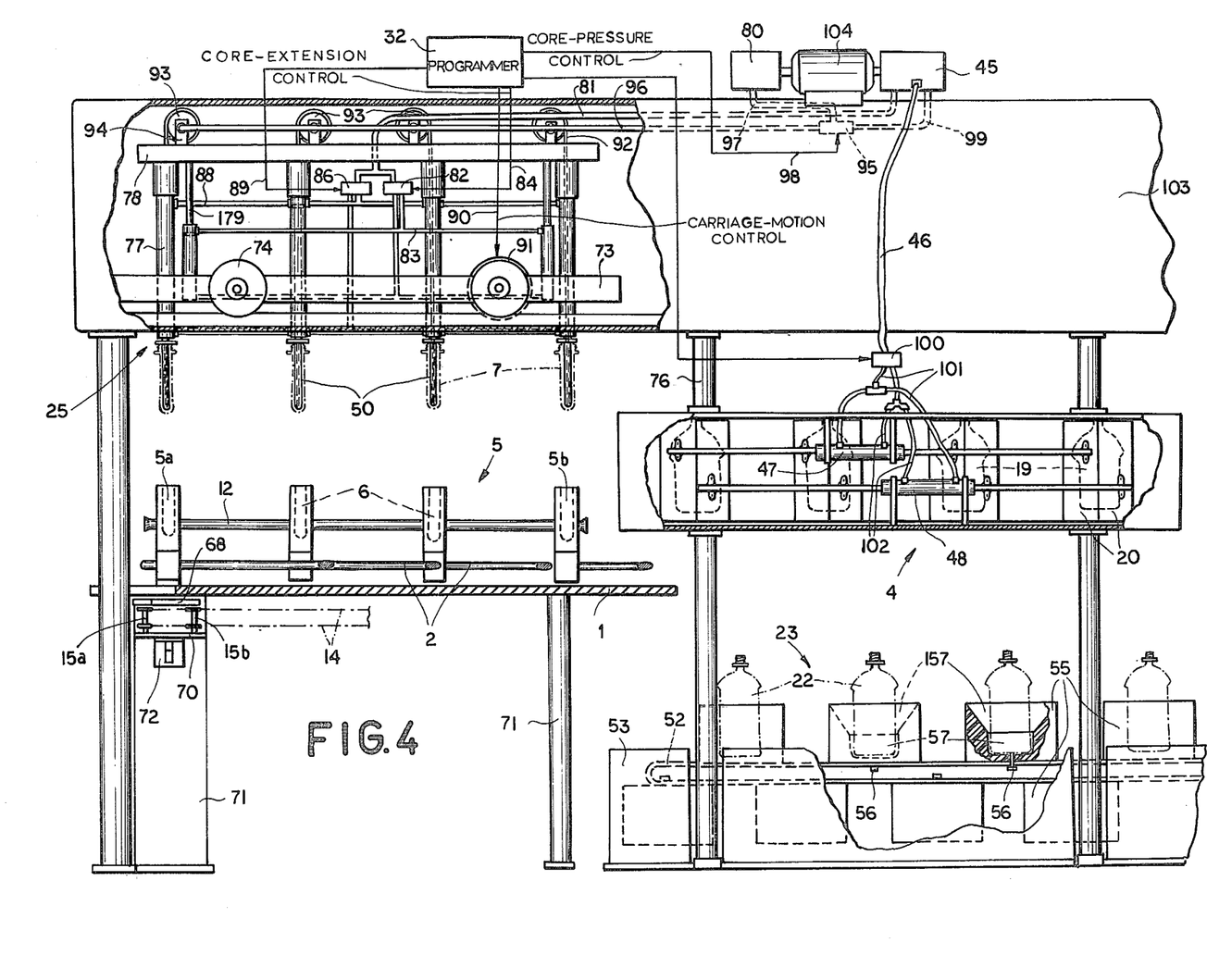
FIG. 4 is an end-elevational view, partly in section and also drawn to a larger scale, of a significant part of the blow-molding unit shown in FIGS. 1 and 2.

As shown in FIGS. 2 and 4, conveyor 23 comprises an endless belt 52 journaled between uprights 53 and driven by a motor 54. A multiplicity of plastic containers 55 attached to belt 52 by respective bolts 56 form receptacles 57 with funnel-shaped mouths 157 receiving pairs of newly formed bottles 22 which fall from respective cells 19 upon the separation of half-shells 20 at the end of a blowing cycle. Motor 54 is controlled by programmer 32 via a circuit 58 for moving conveyor belt 52 in steps synchronized with the operating cycles of unit 4.

Figure 5:
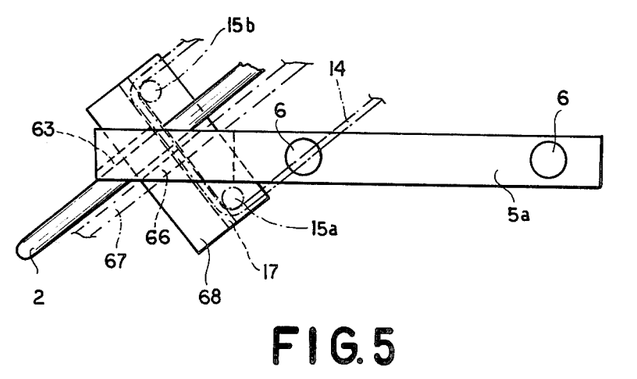
FIG. 5 is a fragmentary top view showing details of a carrier and of an associated transfer track.
Figure 6:
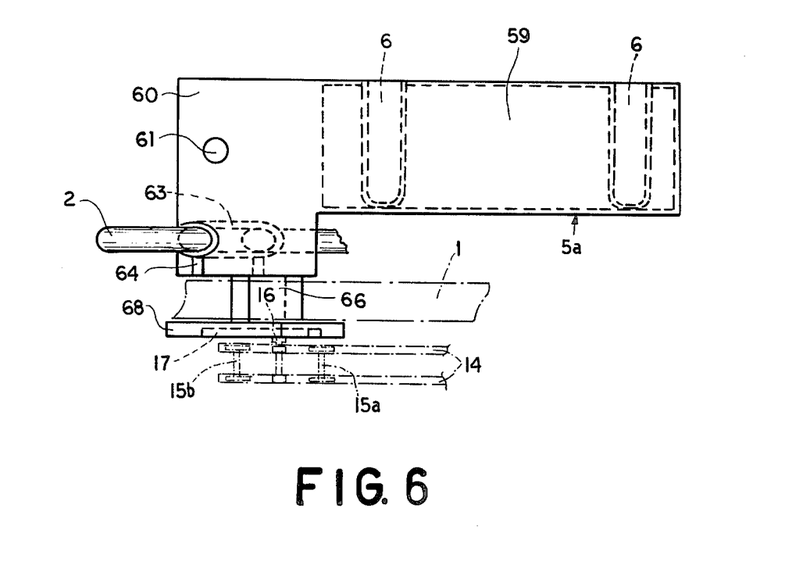
FIG. 6 is an elevational view of the elements shown in FIG. 5.

As representatively illustrated in FIGS. 3, 5, 6 for transfer boxes 5a' and 5a, each box or carrier 5, 5' includes a rectangular casing 59 in which the two parison-shaped pockets 6 (or 6') are formed from a thermally insulating (e.g. ceramic) material; casing 59 is cantilivered on a solid prismatic block 60 provided with two apertures 61, 62 respectively traversed by the connecting rod 12 (or 12') and by the associated guide rail 2 (or 2'). Aperture 62 is partially lined with a slotted sleeve 63 of friction-reducing material such as polytetrafluoroethylene and communicates with the underside of block 60 via a bottom slot 64 accommodating legs 65 (FIG. 2) which support the rails 2 (or 2').

As illustrated in FIGS. 3, 5, 6, carriers 5a' and 5a have webs 66 depending from the undersides of members 60 and paralleling the slots 64. Webs 66 traverse slots 67, 67' (FIG. 1) in bed 1 and carry at their lower ends the foot plates 68 provided with the grooves 17, 17' coacting with lugs 16, 16' as described above. Sprocket wheels 15a–15d, 15a'–15d' are rotatably mounted on shelves 70 secured to legs 71 of bed 1 with the aid of brackets 72 (FIG. 2).

In FIG. 4 we have shown the extractor 25 as comprising a carriage 73 with wheels 74 riding on rails 75 in a stationary housing 103 supported by columns 76 above blow-mold cells 19 and bed 1. Blow-mold cores 50 depend from respective pneumatic jacks 77 rigid at their upper ends with a platform 78 which in turn is mounted on carriage 73 by means of four more jacks 79 (only two of them being visible in the drawing). Plungers 179 of jacks 79 are forcibly retracted by pressurized air flowing from pump 45 through a hose 81, a valve 82 and a conduit 83; in response to signals arriving from programmer 32 over a circuit 84, valve 82 connects hose 81 with a second conduit 85 communicating with jacks 79, thereby extending plungers 179 and raising platform 78 along with jacks 77. Similarly, blow-mold cores 50 are shifted upward or downward relative to platform 78 according to whether pressurized air is fed by a valve 86 to jacks 77 via a first conduit 87 or a second conduit 88, respectively, valve 86 being connected to hose 81 in parallel with valve 82. The action of valve 86 is determined by signals generated on a circuit 89 by programmer 32 which also controls, via a circuit 90 and a reversible-transmission motor 91, the horizontally reciprocating motion of carriage 73.

As further illustrated in FIG. 4, each hollow blow-mold core 50 is connected to a tube 92 which extends longitudinally inside the associated jack 77 and is at least partially wound around a respective spring-loaded sheave 93 rotatably mounted by upright arms 94 on platform 78. Tubes 92 are alternatively connectable in parallel by way of a valve 95 and a conduit 96 with a suction port 97 of a vacuum pump 80 or with a pressure port 99 of pump 45, valve 95 being controlled by programmer 32 via a circuit 98. Conduit 96 communicates with tubes 92 via hollow shafts of sheaves 93.

Another valve 100 alternately connects the conduit 46, by way of branch lines 101, 102, to opposite ends of pneumatic jacks 47, 48, in response to signals received from programmer 32 over circuit 44, for simultaneously closing and then reopening the blow-molding cells 19. Pumps 45 and 80 are driven by a motor 104 mounted on carriage housing 103.

The operation of the system shown in FIGS. 1-6 will now be described with reference to FIG. 7. Prior to a time $t_0$, the two upper injection-mold portions 35 and 35' are clamped to the lower mold portion 28 by jacks 10 and 10' pressurized by pump 40. At time $t_0$, which is the beginning of a 20-second injection-molding cycle, output signals of programmer 32 on circuits 31 and 42 (FIGS. 3 and 2, respectively) command the pump to retract the plungers of jacks 10, thereby raising platen 8 and upper mold portion 35, as indicated in a top graph A of FIG. 7. At a time $t_1$ the upper mold portion 35, together with eight thick-walled parisons 7 held on respective injection-mold cores 36, reaches a top position similar to that shown in FIG. 3 for upper mold portion 35'. Transfer boxes 5 then move into a gap between mold portions 28, 35 (see FIG. 3) at a time $t_2$. From that moment to an instant $t_3$, as indicated in a graph C of FIG. 8, carriers 5 remain in this insertion position in which their pockets 6 are aligned with respective cores 36 depending from upper mold portion 35. During time interval $t_2$-$t_3$, chain lug 16 (see FIGS. 2, 3, 5, 6) travels ineffectually along the groove 17 while the programmer 32 commands the lowering of parisons 7 on cores 36 into the underlying transfer pockets 6.

As described in our copending U.S. patent application Ser. No. 894,376 referred to above, cores 36 are restrained by programmer 32 through a control circuit 105 (FIG. 3) from following the descent of platen 8 and upper mold portion 35, the parisons being positively guided by the stationary cores over part of their length until the major portion of their body has entered the carriers 5. At this instant, neck rings 137 are cammed open and the parisons come to rest in pockets 6 to remain there until removed by extractor 25, as indicated in a graph D of FIG. 7.

At time $t_3$, chain lug 16 begins to rotate around sprocket wheel 15$d$ and to entrain the carrier assembly 5 along the laterally diverging rails 2 toward parison-pickup stations alongside blow-molding unit 4. After a short time interval $t_3$-$t_4$, transfer boxes 5 are completely removed from the gap between mold portions 28, 35 which then begin to close upon each other again, as indicated in graph A. At a time $t_5$, the mold 28, 35 is clamped shut and programmer 32 controls valve 33 to admit fresh liquefied thermoplastic material for a limited period into the associated mold cavities 29, as indicated in a graph B of FIG. 7.

During the first quarter of an operating cycle, as indicated in graphs E and F, carriage 73 registers with blow-molding unit 4 while the blow-mold cores 50 are received in cells 19, the plungers of both sets of jacks 77, 79 being retracted under the control of the programmer-actuated valves 86, 82 so that platform 78 lies at a level below that illustrated in FIG. 4. At a time $t_6$, under the control of valve 100, jacks 47 and 48 separate the blow-mold shells 20 to open the cells 19, as indicated in a graph G of FIG. 7, whereupon newly shaped bottles drop into underlying conveyor receptacles 57; also at time $t_6$, jacks 79 are actuated to extend their plungers 179, thereby elevating the blow-mold cores 50 above the level of cells 19 into the top position of FIG. 4 as indicated by graph E of FIG. 7. Carriage 73 now begins to move leftward along rails 75 (as viewed in FIG. 4) to reach, at a time $t_7$ as indicated in graph F, its position of alignment with rails 2. Both jacks 77 and 79 are then actuated by programmer 32 to lower the cores 50 onto the transfer boxes 5 which have just arrived at the pickup stations represented by the spread-apart terminals of their tracks. When cores 50 reach the bottom of their downward stroke, as determined by the lengths of the plungers of jacks 77 and 79, programmer 32 signals valve 95 to connect conduit 96 with vacuum pump 80, thereby generating in the hollow blow-mold cores 50 a suction sufficient to aspirate the newly arrived parisons 7 from their respective transfer pockets 6 and hold them on cores 50 during an ensuing upward stroke and a lateral shift to the cells 19 of unit 4. This upstroke, caused by the retraction of the plungers of jacks 77 and the substantially simultaneous extension of plungers 179, ends at a time $t_8$ (graph E) as the carriage 73 begins the return to its center position in which it arrives at a time $t_9$. During time interval $t_7$-$t_8$, lug 16 once again travels ineffectually along groove 17 before entraining the carrier assembly 5 back toward injection-molding machine 3. It is, of course, feasible to employ other means such as a reversible transmission system for reciprocating the carriers 5, 5' along guide rails 2, 2'.

Figure 7:
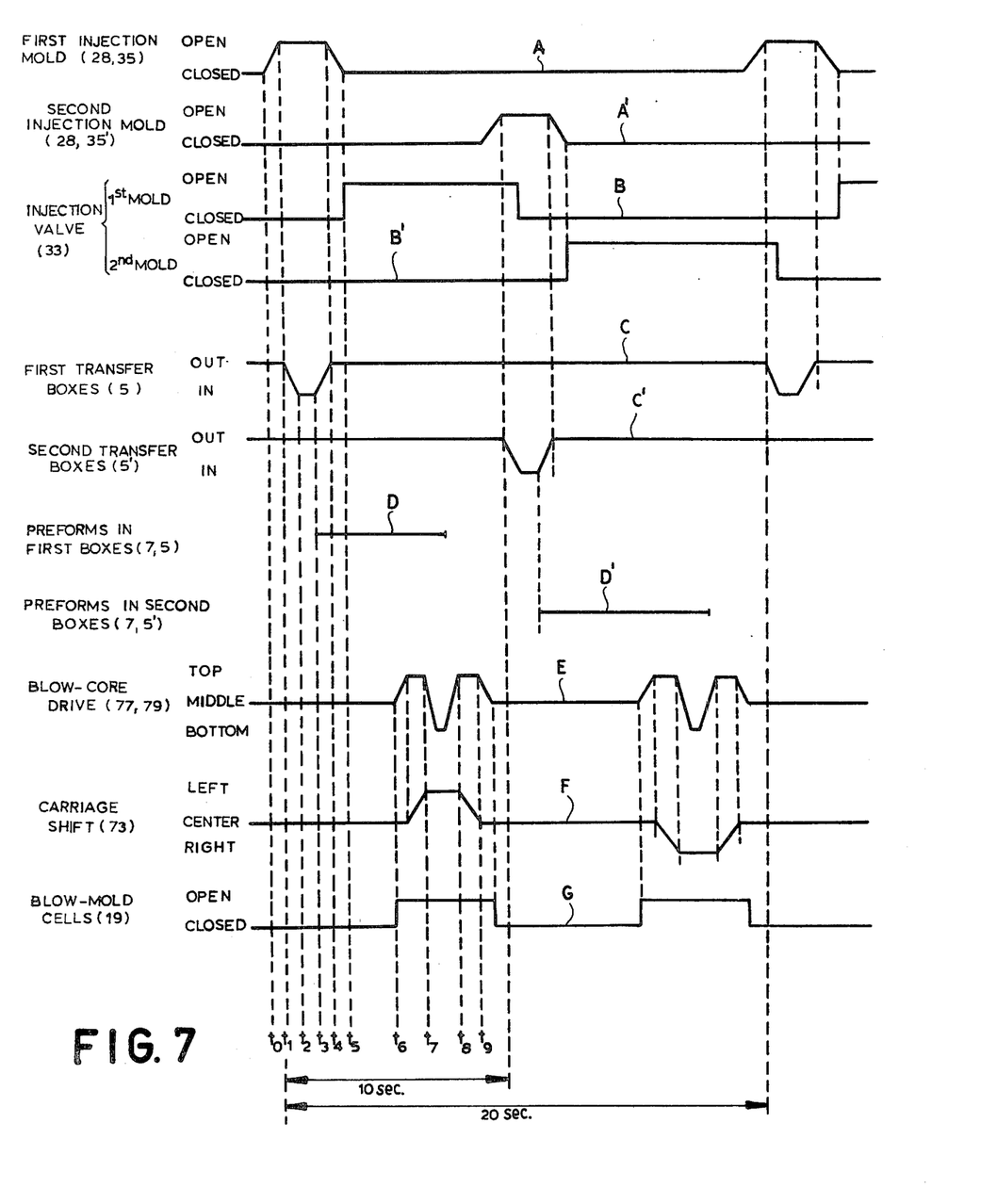
FIG. 7 is a timing diagram relating to the operation of the system.

As indicated in graph E of FIG. 7, the parison-bearing blow cores 50 descend at time $t_9$ to the level of cells 19, whereupon jacks 47 and 48 close the half-shells 20 around them. With their necks grasped by half-shells 20, the parisons 7 are then inflated inside the blow-mold cells 19 by pressurized air fed from pump 45 through conduit 99, valve 95, conduit 96, sheaves 93 and tubes 92. While bottles are being blow-molded in unit 4 (as indicated by graph G) and while parisons are being produced in mold 28, 35, upper mold portion 35' is unclamped from lower mold portion 28 (as indicated in a graph A' of FIG. 7) to permit the removal of eight newly formed parisons 7 from corresponding cavities 29 in the aforedescribed manner, i.e. with insertion of transfer boxes 5' into the gap between mold portion 28 and the upwardly withdrawn cores 36 (graph C'). Immediately upon reclosure of mold 28, 35', fresh thermoplastic material is admitted into the latter cavities for a limited period by valve 33 as indicated by a graph B'. The parisons removed by boxes 5' (graph D') are carried along the laterally diverging guide rails 2' to their pickup stations alongside blow-molding unit 4, opposite the terminals of tracks 2 shown in FIG. 4, for engagement by the cores 50 of carriage 73 after the cells 19 have been emptied of the bottles blow-molded in the first half of the cycle.

Thus, as will be apparent from FIG. 7, the blow-molding unit 4 performs its work on a group of eight parisons 7 during 10 seconds, i.e. in half an operating cycle, of injection-molding machine 3 whereas the latter produces the two groups of parisons in overlapping 20-second cycles. The lateral separation of the parison pairs during transfer from machine 3 to unit 4 minimizes the delay necessary for moving them from the injection cavities to the blow-molding cells, thereby insuring that these parisons are still fairly hot when entering the blow mold so that little or no additional heating will be needed. Naturally, the number of workpieces produced in each cycle, as well as their geometrical arrangement, may be different from that described and illustrated by way of example.

As described in our copending application referred to above, the completed workpieces 22 could be upwardly extracted from blow-molding cells 19 by the cores 50

(or possibly by other means) instead of being dropped out at the bottom.

We claim:

1. A plant for making hollow elongate workpieces of thermoplastic material, comprising:

an injection-molding machine with a multiplicity of cavities for producing inflatable parisons;

a blow-molding unit with a blow mold having cells adapted to receive said parisons, said cavities and said cells forming two substantially parallel elongate arrays with a center-to-center spacing of said cells exceeding that of said cavities in at least the major dimension of said arrays;

programming means for synchronizing the operations of said injection-molding machine and said blow-molding unit;

transfer means controlled by said programming means for receiving parisons from said cavities and delivering the received parisons to respective cells of said blow mold for inflation into completed workpieces, said transfer means including a set of tracks divergingly extending from said injection-molding machine to said blow-molding unit and a plurality of carriers with heat-retaining pockets, conforming to said parisons, respectively guided by said tracks for increasing the separations of transported parisons to an extent corresponding to the difference between the center-to-center spacings of said cavities and of said cells, said pockets being equal in number to said cells and being alignable with respective cavities of said injection-molding machine in a receiving position of said carriers at a narrower end of said tracks, said transfer means further including mechanism for removing the parisons from said pockets in a delivery position of said carriers at a wider end of said tracks and for introducing the removed parisons into respective cells of said blow-molding unit; and unloading means at said blow-molding unit for removing completed workpieces from said cells.

2. A plant as defined in claim 1 wherein said tracks extend generally perpendicularly to said major dimension.

3. A plant as defined in claim 2 wherein said injection-molding machine is provided with a pair of substantially identical injection molds each containing half the number of said cavities, the number of said cells and of said pockets being equal to the number of cavities of each of said injection molds, said injection-molding machine further comprising first operating means controlled by said programming means for closing, filling and opening one of said injection molds in a recurrent first injection cycle and second operating means for closing, filling and opening the other of said injection molds in a recurrent second injection cycle of the same duration as said first cycle but staggered by half said duration with reference thereto, said blow-molding unit further comprising third operating means for closing and opening said blow mold in a recurrent blowing cycle of half the duration of said injection cycles.

4. A plant as defined in claim 3 wherein said tracks are divided into two groups respectively starting at said injection molds and terminating alongside said blow mold on opposite sides thereof.

5. A plant as defined in claim 4 wherein said mechanism comprises a transporter displaceable transversely to said tracks for alternately conveying parisons to said cells from carriers respectively arriving on said two groups of tracks.

6. A plant as defined in claim 5 wherein said transporter comprises a carriage provided with blow cores insertable into said cells together with parisons picked up by said blow cores from said carriers.

7. A plant as defined in claims 3, 4, 5 or 6 wherein said injection molds comprise a common stationary lower mold portion, provided with said cavities, and two separately vertically displaceable upper mold portions carrying groups of mold cores receivable in respective cavities, said tracks extending substantially horizontally at the level of said lower mold portion.

* * * * *